UNITED STATES PATENT OFFICE.

PETER FIREMAN, OF WASHINGTON, DISTRICT OF COLUMBIA, ASSIGNOR TO MAGNETIC PIGMENT COMPANY, OF NEW YORK, N. Y., A CORPORATION OF NEW YORK.

POLISHING COMPOUND.

1,025,946.  Specification of Letters Patent.  Patented May 7, 1912.

No Drawing. Application filed January 15, 1909, Serial No. 472,539. Renewed March 30, 1912. Serial No. 687,527.

*To all whom it may concern:*

Be it known that I, PETER FIREMAN, a citizen of the United States, residing at Washington, in the District of Columbia, have invented certain new and useful Improvements in Polishing Compounds; and I do hereby declare the following to be a full, clear, and exact description of the invention, such as will enable others skilled in the art to which it appertains to make and use the same.

My invention relates to certain new and useful improvements in polishing and particularly to the polishing of plate glass by means of the usual polishing machines employed for that purpose, wherein the plate glass to be polished is secured upon a supporting bed or table and is traversed by the customary felt clad polishing blocks which are usually given either a circular motion or a reciprocating motion in a rectilinear path.

My invention resides in the discovery that chemically precipitated magnetic oxid of iron, which alone, or mixed only with water, is not adapted for the polishing of plate glass surfaces in machines of this character, for the reason that it scratches the glass under those conditions, is rendered highly effective as a plate glass polishing agent and develops a brilliant luster peculiar to its use, and with the employment of a comparatively moderate amount of the chemically precipitated magnetic oxid of iron, provided it is admixed with a suitable quantity of a soluble compound (such as sulfate of iron) in solution in water. I have discovered that the superior luster incident to the employment of this mixture of chemically precipitated magnetic oxid of iron, water, and soluble compound, can be obtained without increasing the duration of the usual polishing operation, and, in some instances, with a diminution of the polishing period, and, furthermore, with the employment of an amount of the chemically precipitated magnetic oxid of iron oftentimes as low as one third of the amount by weight of the rouge, or like polishing agents ordinarily employed in plate glass polishing.

In carrying out my invention, when sulfate of iron is employed as the soluble compound, I combine the ingredients in such manner that the mixture of chemically precipitated magnetic oxid of iron, water and sulfate of iron, when its ingredients are intimately incorporated with each other by stirring, shall have a specific gravity of from 1 to 3 degrees Baumé, and so that the clear liquid, after settling, shall have a specific gravity from .4 degrees to 1.2 degrees Baumé, these proportions being suitable in practice for the production of efficient and quick results; although it is obvious that they may be somewhat varied without departing from the spirit of the invention, as the conditions of use will vary, e. g., the character and velocity of the motion of the polishing blocks, the prevailing temperature, and the like. What is of importance is that a certain correspondence be maintained between the thickness of the mixture (represented by the specific gravity of the freshly stirred up ingredients) and the concentration of the soluble compound (represented by the specific gravity of the solution after the precipitated magnetic oxid has settled); the greater the thickness, the greater the concentration. This ratio may be a different one for the different types of polishing machines. The hereinbefore ratios were found well adapted for polishing machines with a reciprocating motion in rectilinear path. In general, I recommend that for expeditious work, a thicker mixture be used in the earlier stages of the process, and a thinner one in the latter stages.

In utilizing the polishing agent thus prepared, the operator applies it to the surface of the plate glass to be polished, by first thoroughly stirring it and splashing it upon the surface, from a can, with a round brush, or the like. The circular or reciprocating motion of the blocks thereupon spreads the polishing agent, first, as a slimy layer over the surface of the plate glass with approximate uniformity and it is likewise gradually taken up, as is usual in polishing operations of this general character, by the said pads of felt with the formation of a layer of the polish thereon. As the polishing operation (which usually lasts a number of hours, according to the character of the machine and the character of the plate glass itself, or the work to be performed upon it) progresses, the glass becomes highly heated, so that when the polishing agent is applied, the water evaporates in large volume. Under these conditions the polishing agent begins to cake upon the polishing surfaces of the pads of felt, and the chemically precipitated magnetic oxid of iron, were it not for the presence of the sulfate of iron, would thereupon become hard, closely compacted, brittle and inelastic and would scratch the plate glass surface and would adhere tenaciously in some places to the glass and "gum up", thereby causing irregular working. The presence of the sulfate of iron, however, intimately intermingled with the chemically precipitated magnetic oxid of iron prevents these tendencies, while not interfering with the polishing effect, but permitting it to proceed to the end with the development of a brilliant luster characteristic of the employment of the mixture. The reason for this combined action of the chemically precipitated magnetic oxid of iron, which is amorphous, and of the sulfate of iron, which is crystalline, is somewhat obscure, but it is probably to be attributed to the circumstance that the homogeneously intermingled amorphous and fine crystalline particles form a caked surface on the pads which is more elastic and which does not tend to become closely compacted and brittle, as would be the case if the sulfate of iron, or other soluble compound, were not present, but, however, this may be, it is a further circumstance of great economical importance in connection with my discovery that, as hereinbefore noted, the high efficiency and the capacity for producing a peculiarly brilliant luster obtained by the use of my improved polishing agent is secured at an expenditure of a relatively small amount of the chemically precipitated magnetic oxid of iron, in comparison with the amount by weight of rouge, or other like oxids, natural or artificial, usually employed in the plate glass polishing art.

What I claim is:

1. A polishing agent for plate glass polishing machines, consisting of chemically precipitated magnetic oxid of iron, water, and a soluble compound; substantially as described.

2. A polishing agent for plate glass polishing machines, consisting of chemically precipitated magnetic oxid of iron, water, and a soluble compound, the specific gravity of the mixture when its ingredients are intimately intermingled by stirring being approximately one to three degrees Baumé, and the specific gravity of liquid solution, after settling, being approximately .4 to 1.2 degrees Baumé; substantially as described.

In testimony whereof I affix my signature, in presence of two witnesses.

PETER FIREMAN.

Witnesses:
H. M. STERLING,
CHAS. J. O'NEILL.